Jan. 9, 1962 V. C. AMBLER ETAL 3,015,996
BAGS AND METHOD AND MACHINE FOR MAKING SAME
Filed Jan. 2, 1958 2 Sheets-Sheet 1
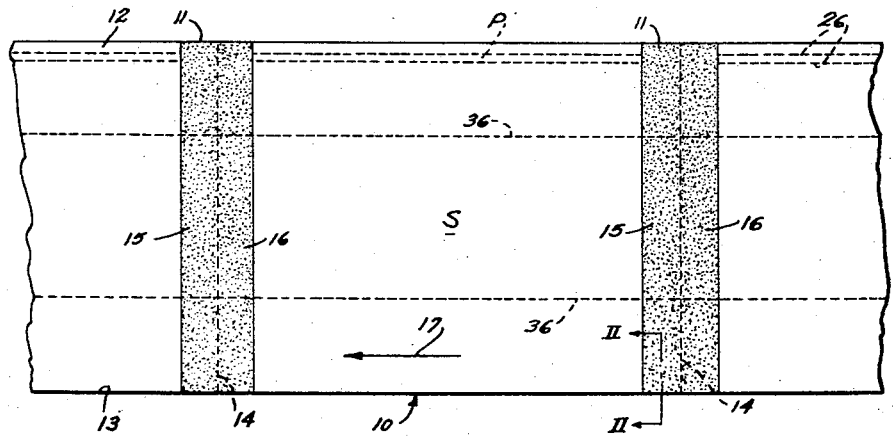
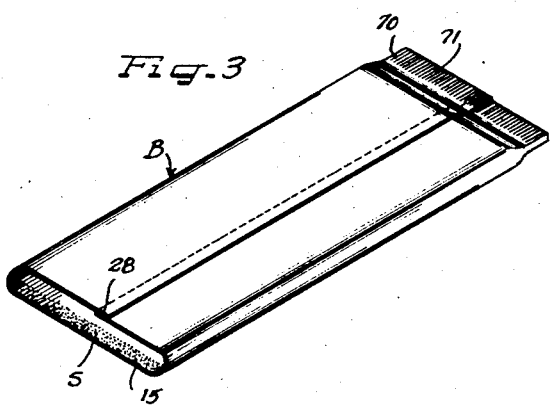
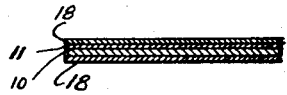
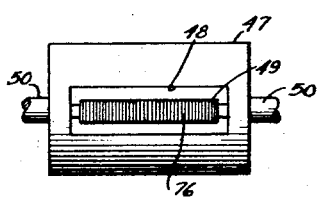
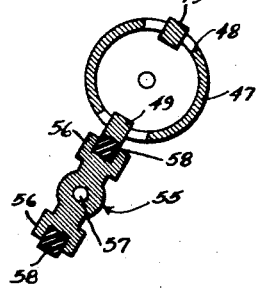
Inventors
VERNON C. AMBLER
ESCA E. ANDERSON
FAY WRIGHT

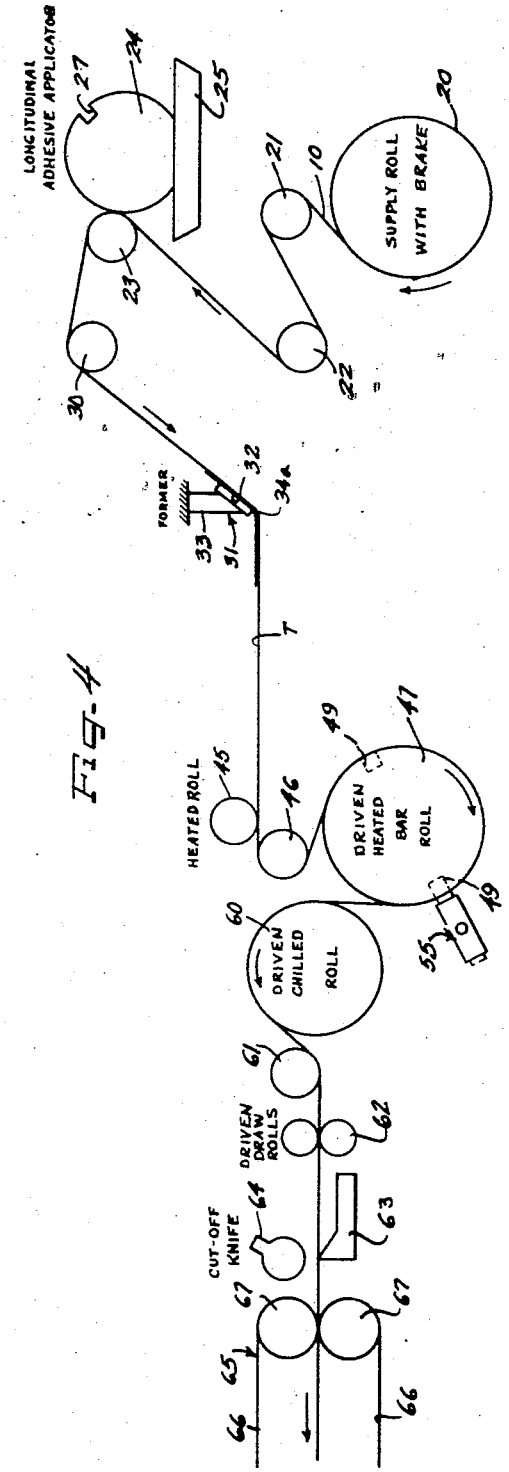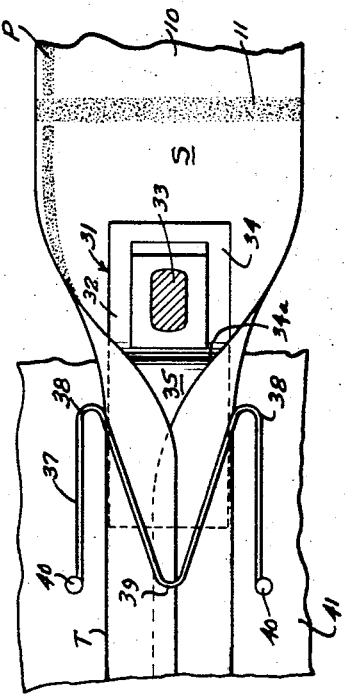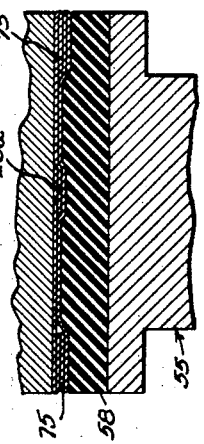

United States Patent Office 3,015,996
Patented Jan. 9, 1962

3,015,996
BAGS AND METHOD AND MACHINE FOR MAKING SAME
Vernon C. Ambler, Box 272, Esca E. Anderson, 431 18th SE., and Fay Wright, 1124 Church, all of Paris, Tex.
Filed Jan. 2, 1958, Ser. No. 706,680
2 Claims. (Cl. 93—8)

This application is a continuation-in-part of application Ser. No. 553,371, filed December 15, 1955, now abandoned.

This invention relates to a method of making relatively moisture- and greaseproof bags having heat sealed bottoms and heat sealable tops. More particularly the invention relates to a continuous method of making such bags from a web of thin, flexible material, such as paper, or a plastic film, which may have been pre-waxed on one or both sides to impart moisture- and greaseproofness to the material. The wax coating presents specific problems in the forming of hermetically heat sealed bottoms for the bags and in providing heat sealable tops so that the bags, after filling, can be completely heat sealed.

It is therefore an important object of this invention to provide a method that overcomes these problems, that is cheap and economical and that produces substantially moisture- and greaseproof bags that are highly satisfactory for packaging high bulk, low weight, greasy food products such as potato chips, corn confections and the like.

It is a further important object of this invention to provide a continuous method of making heat sealed and heat sealable bags from a continuous web of thin, flexible material that has been waxed on one or both sides and in so carrying out the bag-forming operation that the waxed web material is not sharply creased along its lateral folded edges to such an extent as to destroy or largely reduce the moisture- and greaseproofness of the wax coating and even weaken the strength of the fibers at such creases.

It is a further important object of this invention to provide a method of making bags that will give bags of a substantially uniform thickness throughout so that when the bags are used in the magazine of automatic bag-opening machines the thickness of the stacked bags is not greater at one end than at the other, whereby the capacity of the feed magazine is greatly increased in comparison with bags having folded up bottom ends.

It is a further important object of this invention to provide a method of making bags in which the bag-forming web material while in a flat, extended condition has applied thereto transversely extending bands of a thermoplastic adhesive of sufficient width lengthwise of the web to provide a hermetic seal for the bottom of each bag and a heat sealable top for each bag, and the web material is waxed on one or both sides before being formed into a tube from which the bags are formed by the application of heat and pressure to said transverse bands to activate the adhesive thereof and effect a permanent bond that includes the wax of the adjacent wax coating, and by subsequently severing at such bands.

Other and further important objects of this invention will become apparent from the following description and appended claims, taken in connection with the annexed drawings, in which, FIGURE 1 is a broken plan view of a flat web of extended length that has been provided with transversely extending bands of a thermoplastic adhesive and that has been waxed on at least the surface containing such bands to form a continuous wax coating thereover;

FIGURE 2 is an enlarged fragmentary sectional view taken substantially along the line II—II of FIG. 1;

FIGURE 3 is a perspective view of a finished bag embodying the principles of our invention;

FIGURE 4 is a diagrammatic side elevational view of the bag-making apparatus illustrating the method of our invention starting with a web such as shown in FIGURE 1.

FIGURE 5 is a fragmentary top plan view of the tube-former used for forming the web into a flattened tube, with a part showing in section;

FIGURE 6 is a sectional view of the heat and pressure applicator-roll assembly;

FIGURE 7 is an elevational view of the crimping heater bar used in the roll assembly illustrated in FIGURE 6; and FIGURE 8 is an enlarged sectional view of a heater bar sealing assembly showing the application of heat and pressure to a side tuck type of tube for forming a bag with tucked-in side walls.

Referring particularly to FIGURES 1 to 3, the reference numeral 10 indicates generally a web of thin, flexible material of indefinite length that has been provided with bands 11 of a thermoplastic adhesive. Said bands 11 are generally rectangular in shape and extend the full width of said web 10 from one lateral edge 12 to the other lateral edge 13. Each of said bands 11 is of sufficient width lengthwise of the web 10 to afford both a seal for the bottom of one bag and also a sealable top for an adjacent bag. As indicated by the dotted line 14, each band 11 may be considered as divided by a median line 14 into a leading half-band 15 and a trailing half-band 16, the direction of movement of the web being that indicated by the arrow 17. The distance between successive median lines 14, 14 determines the individual bag lengths.

Ordinarily, the web 10 will be formed of a thin paper such as glassine paper, suitable for waxing to give a relatively translucent bag. The paper as it comes from a mill roll in the flat first goes through an applicator and then into the printing press, after which it is wound up. If the paper is to be waxed, it goes to the waxing machine as a separate operation. The applicator which may be driven from the press, applies to the surface that is to be the inner surface of the bag the localized spaced bands of thermoplastic adhesive. The web 10 may be waxed either on one or both sides. In the case of the structure indicated by FIG. 2, the web 10 is provided with a coating of wax 18 on both sides, but it is sometimes preferred to coat only one side, in which case that side would be the inner side S of the finished bag. The term "wax" is here used in a generic sense to indicate any wax or wax-like coating having the desired moisture and greaseproofness, flexibility and other properties. Paraffin wax compositions including modifiers or additives such as vinyl, polyethylene, polyisobutylene, rubber hydrochloride and other polymers are intended to be included within the meaning of the term used.

A roll 20 (FIG. 4) provides a source of supply of the web 10 for processing in accordance with the method of our invention. From the roll 20, which is conventionally provided with a brake (not shown) for maintaining the web under tension, the web 10 is trained successively around guide rolls 21 and 22 into the nip between a backing roll 23 and an adhesive applicator roll 24. Said applicator 24 is a disk-like roll that dips into a supply of paste, adhesive, or the like, contained in a supply pan 25. The roll 24 is of sufficient width to apply to the web 10 a continuous, narrow strip of adhesive P along one edge, such as the edge 12, as indicated by the dotted lines 26, 26 in FIG. 1. Said roll 24 is provided with a transverse notch 27 that interrupts the application of the paste at those areas of the web represented by the bands 11 of thermoplastic adhesive. The adhesive strip P between the dotted lines 26, 26 thus extends between the successive adhesive bands 11 to provide, in combination with said bands, a continuous longitudinal seam, such as the seam 28, when the web is formed into a tube in the manner about to be described.

Instead of applying an adhesive by means of the roll 24, we may apply an extruded cement, such as Thermogrip, sold by United Shoe Machinery Company. In that case, the extruded thermoseal is applied on the bag machine between the heel of the former 31 and the heated disk 45 (FIG. 4). The disk 45, which has a working face of about ½″ in width provides the heat necessary to complete the sealing of the longitudinal seam 28 (FIG. 3).

From the applicator 24, the web passes over a tension guide roll 30 and into contact with a former 31. As shown in greater detail in FIGURE 5, the former 31 includes a smoothly bent shoe 32 secured to the lower end of a suitably suspended shank 33. The shoe 32 has a forwardly and downwardly inclined portion 34 and an integral forwardly extending horizontal portion 35, which portions are joined by a smoothly rounded heel 34a and together provide a tube-forming member of rectangular outline and of a width represented by the distance between the dotted lines 36, 36 shown in FIGURE 1, which is to be the width of the tube T and of the ultimate bags B formed therefrom. To assist in the forming operation, a spring wire 37 of generally M-shape resiliently overlies the forward extending portion 35 of the forming shoe 32. The looped end portions 38 of the wire 37 assist in folding over the margins of the web 10 with the adhesive strip P therebetween, while the looped intermediate portion 39 of the wire aids in pressing said adhesived overlapping margins into firm engagement with each other. The ends 40, 40 of the straight legs of the M-shaped wire 37 are secured to a supporting surface so as to develop the proper degree of resilient pressure between the wire 37 and the folded over portions of the web 10 to accomplish the tube-forming operation without undue abrasion of the waxed surface of the web and without too severe a creasing of the folded edges of the resulting tube T. Other specific formers can be used, but the one here shown and described has been found particularly suitable.

The flattened tube T passes from the former 31 under a heated disk 45 of narrow width of working face that serves to heat and join together the overlapped margins of the tube along the adhesive strip P. Preferably there is only light or "kissing" contact between the heated disk 45 and the flattened tube T at a point where the tube is unbacked but held taut between the former 31 and a guide roll 46.

The guide roll 46 is so positioned relative to a heated bar roll 47 that the flattened tube T is caused to lap the major portion of the periphery of said roll 47 and be held snugly thereagainst. Said roll 47 has a plurality of transversely extending openings 48 (FIGS. 6 and 7) in the periphery thereof, in which are positioned heated bars 49. Although only two such openings 48 and bars 49 are shown, it will be understood that more or fewer may be used depending upon the diameter of the roll 47 and the length of the bags to be formed. A different diameter roll, or cylinder, may be required for different bag lengths. The bars 49 are of the proper width to be coextensive in area with a half-band 16 of each of the adhesive bands 11 and the spacing peripherally of said bars 49 is equal to the distance between successive half-bands 16 on the flattened tube T. The bars 49 are suitably heated, as by electrical resistance elements (not shown) and are rigidly mounted so that their outer surfaces extend slightly beyond the periphery of the roll 49. The roll may comprise an aluminum shell mounted upon stub shafts 50 by means of discs or spiders at each end (not shown) that also serve to rigidly support the heater bars 49. The ventilation effect of the slots or openings 48 is sufficient to prevent any substantial heating of the shell of the roll 47 and to aid in maintaining the leading half-bands of the transverse adhesive bands 11 cool.

Associated with a heater bar 49 for coaction therewith is a resilient pressure applicator indicated generally by the reference numeral 55, shown in greater detail in FIG. 6. The pressure applicator 55 comprises a pair of oppositely extending arms 56 mounted for rotation about a shaft 57. Each arm 56 carries at its extremity a bar 58 of a resiliently deformable material such as neoprene rubber or a silicone resin. The bars 58 are similar in size and extend to the heater bars 49 and are adapted to coincide therewith during rotation of the shaft 57 at a speed synchronized with the speed of rotation of the roller 47. During the interval of coincidence between the heater bars 49 and the resilient bars 58, the portions of the flattened tube T coextensive with the half-bands 16 are resiliently held between the opposed faces of said respective bars and the thermoplastic adhesive which by that time has been melted by virtue of its prolonged contact with the bar 49, is caused to penetrate the intervening wax coating and intermingle therewith.

In order to set the softened thermoplastic adhesive-wax mixture that results, the flattened tube T is passed from the roll 47 to a chilled roll 60, around which it is lapped for a sufficient extent to chill and set such mixture and thereby effect a heat-seal between the plies of the tube T coextensive with each half-band 16. The heated bar roll 47 and chilled roll 60 are both driven and so positioned relative to each other as to provide a capstan around which the tube is lapped and by means of which the tube is drawn from the supply roll 20.

Thereafter, the flattened, heat-sealed tube T is passed under a guide roll 61, between driven draw rolls 62, that served to maintain the tube under tension, and to a severing stage represented by a bed knife 63 and a rotary cut-off knife 64. The upper draw roll 62 may conventionally comprise spaced narrow rolls that are positioned between the longitudinal seam 28 and the lateral edges of said tubing so as not to apply positive pressure to either the seam or edges, thereby avoiding squeezing the adhesive out of the seam or unduly creasing said edges. The speed of rotation of the cut-off knife 64 is so synchronized with the speed of rotation of the draw rolls 62, 62 that severance of the flattened tube takes place exactly along each median line 14. The bags B, so formed, are successively received, heat-sealed end first, by a belt conveyor, indicated generally at 65, just prior to, or simultaneously with the severing of the trailing end of the bag. The conveyor 65 feeds the bags to a stacker or other form of loader (not shown), in which the bags may be stacked vertically with their heat-sealed bottoms lowermost. The conveyor may comprise belts 66, 66 trained around pulleys 67, 67 driven at a sufficient speed that the cooperating belts draw the severed bags away from the severing stage at a greater linear speed than that of the travel of the flattened tube through the draw rolls 62, 62.

The finished bag B (FIG. 3) has a hermetically sealed bottom 70 that is coextensive in its sealed extent with a half-band 16 and that terminates in a severed edge 71. Accordingly, unless the bottom is turned up and folded against the bag, the bag is uniform in thickness throughout its length, and is no thicker at its bottom than at its top. Since a considerable saving in material can be effected by not turning up the bottom, that operation is preferably omitted. The heat sealed bottom 70 is so tight and strong that there is no necessity for turning up the bottom.

In addition to the heat seal effected at the bottom 70 of each bag, the upper end of each bag is capable of being heat sealed, after it is filled by virtue of the half-band 15 (FIG. 3) of thermoplastic material left on the inside surface S adjacent such open edge.

Although our invention has been disclosed in connection with the making of a plain tube type of bag, it is also applicable to the making of pleated or gusseted bags in which the lateral walls are provided by an inturned tuck or pleat. This type of bag is formed the same as shown in the drawings already described except that a conventional former is used for forming the side tucks. In the heating and pressing step illustrated in FIG. 8, the bag shown is of the side pleated type and includes inturned pleats 75, 75 at each side, as well as the longitudinal seam 28a, similar to the longitudinal seam 28. The resilient bar 58 deforms slightly to accommodate the resulting non-uniformity in the thickness of the heat-sealed tube joint, as illustrated in FIG. 8. The heat sealed joint so formed is just as effectively a hermetic seal as in the case of the plain tube-type bags.

Where the web material is cellophane, it is generally necessary to form the heat sealed bottom 70 of the bag with transverse crimping and in that case the heater bar 49 is knurled, or serrated, as at 76 (FIG. 7). There are advantages to a crimped type of bottom seal regardless of whether cellophane is used, or paper.

Although the half-bands 15 and 16 of thermoplastic adhesive material have been shown as halves of a full width band 11, the half-bands need not be exactly the same in width and may be separated by a thin strip not coated with the thermoplastic material. In the interest of economy, however, the arrangement of half-bands described is preferred. The widths here contemplated of the half-bands are only ¼ to ⅜", although slightly wider bands may be used if desired. The advantage of such narrow half-bands is, of course, a saving in cost, and the sealed joints of the widths indicated are just as effective as joints 1" in width. In combination with a straight bottom seal, or "fin" bottom as it is sometimes called, as against a conventional turn-back bottom, we are able to effect very substantial savings in what must necessarily be a low cost item because of the low price at which the filled bags are to be sold. The heat-sealed joints herein described are exceptionally effective because the thermoplastic material and wax are caused to fuse and intermingle to an extent sufficient to form an actual bond directly between the fibers of the paper constituting the plies to be joined.

Various thermoplastic materials are available on the market for forming the transverse bands 11. One such thermoplastic adhesive is an emulsion sold under the proprietary name Reslac by the Borden Company.

Another is called Polybond D-373, sold by Polymer Southern, Inc., Greenville, South Carolina.

These materials, when dry or semi-dry, do not block because of their relatively high melting point but seal to themselves when reactivated by heat. The thin film of wax overlying the thermoplastic material, when heated, is no hindrance to the formation of a good, firm seal. On laminated glassine that is not waxed a hot melt material sold under the proprietary name Proxmelt by Pyroxylin Products Company, Chicago, Ill., is most effective for our purpose in that the thermoplastic material itself flows under pressure into the finest crevices and spaces, including those at the edge of the inside creases of side tucks (FIG. 8) where four plies of the tuck style bag become two plies across the center of the bag. To effect this spreading of the relatively high melting point thermoplastic adhesive, the material must not only be heated sufficiently hot but there must be sufficient dwell to permit the heat to penetrate through as many as four plies of the laminated paper, and there must be sufficient pressure applied to the melted adhesive to squeeze it into the innermost parts of the creases, particularly where the four plies of side tuck bag merge into a two ply central portion. These objectives are accomplished by a combination of the following: first, a sufficiently high temperature, such as is provided by the electrically heated bars 49; secondly, a sufficiently long dwell, during which a bar 49 is in contact with the tube T, accomplished by lapping the tube T about 270° or more of the cylinder 47; and thirdly, a sufficient degree of pressure such as results from wrapping the tube tightly about the cylinder 47 and bars 49, augmented by the pressure device 55.

The adhesive used in forming the longitudinal adhesive strip P can be a thermoplastic adhesive, the same as used for the transverse bands 11 or any other suitable thermoseal material. In that case it is not necessary that the adhesive strip P terminate at each of the transverse bands 11; the strip may be continuous and extend over said transverse bands.

We claim as our invention:

1. In a machine for making bags from a continuous web having on the surface that becomes the inner surface of said bags transverse bands of a relatively high melting point thermoplastic adhesive and having a paraffin wax coating that is continuous over said bands, means for forming said web into a flattened tube having a longitudinal seam intermediate the sides of said tube, a heated bar roll having circumferentially spaced heated bars engageable with the trailing halves only of said transverse bands of adhesive and having segments of high heat conductivity between said bars and spaced therefrom to accommodate the circulation of air through said roll to maintain the web and the leading halves of said transverse bands of adhesive cool, adjacent guide and chill rolls wrapping the tube about said heated bar roll for a greater portion of the circumference thereof and maintaining the trailing halves of said transverse bands in engagement with said spaced heated bars and chilling the melted thermoplastic adhesive in the trailing halves of said bands, and means for severing said tube along a median line between said trailing half and said leading half of each band of adhesive to form bags with heat sealed closed bottoms and open tops that are heat sealable.

2. A bag making machine in accordance with claim 1, wherein a resilient deformable rotatable bar cooperates with said heated bars on said heated bar roll to apply pressure to the trailing halves of the transverse bands of adhesive while backed by said heated bars and after said thermoplastic adhesive in said trailing half-band has melted to aid in spreading the same.

References Cited in the file of this patent

UNITED STATES PATENTS

| | | |
|---|---|---|
| 1,655,634 | Sevigne | Jan. 10, 1928 |
| 2,125,758 | Waters | Aug. 2, 1938 |
| 2,237,327 | Bell | Apr. 8, 1941 |
| 2,326,931 | Dalton | Aug. 17, 1943 |
| 2,358,455 | Hallman | Sept. 19, 1944 |
| 2,428,837 | Denton | Oct. 14, 1947 |
| 2,467,879 | Billeb | Apr. 19, 1949 |
| 2,737,859 | Allison et al. | Mar. 13, 1956 |
| 2,847,915 | Rapp | Aug. 19, 1958 |